（12）United States Patent
Gonze et al.

(10) Patent No.: US 7,594,940 B2
(45) Date of Patent: Sep. 29, 2009

(54) ELECTRICALLY HEATED PARTICULATE FILTER DIAGNOSTIC SYSTEMS AND METHODS

(75) Inventors: Eugene V. Gonze, Pinckney, MI (US); Michael J. Paratore, Jr., Howell, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 84 days.

(21) Appl. No.: 11/811,450

(22) Filed: Jun. 8, 2007

(65) Prior Publication Data

US 2008/0302086 A1 Dec. 11, 2008

(51) Int. Cl.
*B01D 39/00* (2006.01)
*B01D 24/00* (2006.01)
*B01D 39/06* (2006.01)
*B01D 39/14* (2006.01)

(52) U.S. Cl. ............................. 55/283; 55/522; 55/523; 55/524

(58) Field of Classification Search ........... 55/522–524, 55/283
See application file for complete search history.

(56) References Cited

U.S. PATENT DOCUMENTS

| 3,766,715 | A | * | 10/1973 | Archer | 95/279 |
| 3,889,464 | A | * | 6/1975 | Gardner | 60/286 |
| 4,456,457 | A | * | 6/1984 | Nozawa et al. | 55/283 |
| 4,505,726 | A | * | 3/1985 | Takeuchi et al. | 55/282 |
| 4,516,993 | A | | 5/1985 | Takeuchi et al. | |
| 4,522,027 | A | * | 6/1985 | Hasegawa et al. | 60/274 |
| 4,829,766 | A | * | 5/1989 | Henkel | 60/303 |
| 5,024,054 | A | * | 6/1991 | Barris et al. | 60/274 |
| 5,207,807 | A | * | 5/1993 | Manfre et al. | 55/282.1 |
| 5,212,948 | A | * | 5/1993 | Gillingham et al. | 60/288 |
| 5,391,218 | A | * | 2/1995 | Jorgenson et al. | 95/20 |
| 5,397,550 | A | * | 3/1995 | Marino, Jr. | 422/178 |
| 5,458,673 | A | * | 10/1995 | Kojima et al. | 95/11 |
| 5,480,621 | A | * | 1/1996 | Breuer et al. | 422/174 |
| 5,528,446 | A | * | 6/1996 | Sankaran et al. | 361/25 |
| 6,120,583 | A | * | 9/2000 | Saito et al. | 95/278 |
| 6,171,366 | B1 | * | 1/2001 | Vicard et al. | 95/1 |
| 6,290,757 | B1 | * | 9/2001 | Lawless | 96/19 |
| 6,989,048 | B2 | * | 1/2006 | Bardon et al. | 95/278 |
| 2004/0189251 | A1 | * | 9/2004 | Kutkut et al. | 320/128 |
| 2005/0056595 | A1 | * | 3/2005 | Reamsnyder et al. | 210/741 |
| 2008/0000355 | A1 | * | 1/2008 | Seeley et al. | 96/32 |

OTHER PUBLICATIONS

About.com, Diagnostic Trouble Code, Jan. 31, 2006, http://autorepair.about.com/cs/generalinfo/l/bldef_154a.htm.*

* cited by examiner

*Primary Examiner*—Walter D Griffin
*Assistant Examiner*—Amber Orlando (57) ABSTRACT

A system that diagnoses regeneration of an electrically heated particulate filter is provided. The system generally includes a grid module that diagnoses a fault of the grid based on at least one of a current signal and a voltage signal. A diagnostic module at least one of sets a fault status and generates a warning signal based on the fault of the grid.

20 Claims, 7 Drawing Sheets

ELECTRICALLY HEATED PARTICULATE FILTER DIAGNOSTIC SYSTEMS AND METHODS

STATEMENT OF GOVERNMENT RIGHTS

This invention was produced pursuant to U.S. Government Contract No. DE-FC-04-03 AL67635 with the Department of Energy (DoE). The U.S. Government has certain rights in this invention.

FIELD

The present disclosure relates to methods and systems for diagnosing particulate filters.

BACKGROUND

The statements in this section merely provide background information related to the present disclosure and may not constitute prior art.

Diesel engines typically have higher efficiency than gasoline engines due to an increased compression ratio and a higher energy density of diesel fuel. A diesel combustion cycle produces particulates that are typically filtered from diesel exhaust by a particulate filter (PF) that is disposed in the exhaust stream. Over time, the PF becomes full and the trapped diesel particulates must be removed. During regeneration, the diesel particulates are burned within the PF.

Some regeneration methods ignite particulate matter present on the front of the PF via a front surface heater. Regeneration of particulate matter present inside the PF is then achieved using the heat generated by combustion of particulate matter present near the heated face of the PF or by the heated exhaust passing through the PF. In order to ensure proper regeneration, the particulate matter should be ignited at a desired temperature. When the start up does not achieve the optimal temperature, an inefficient regeneration occurs thus, causing accumulation of particulate matter in the PF.

SUMMARY

Accordingly, a system that diagnoses regeneration of an electrically heated particulate filter is provided. The system generally includes a grid module that diagnoses a fault of the grid based on at least one of a current signal and a voltage signal. A diagnostic module at least one of sets a fault status and generates a warning signal based on the fault of the grid.

In other features, a method of diagnosing an electrically heated diesel particulate filter is provided. The method generally includes: diagnosing a fault of the grid based on at least one of a current signal and a voltage signal; and setting a fault status based on the fault of the grid.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
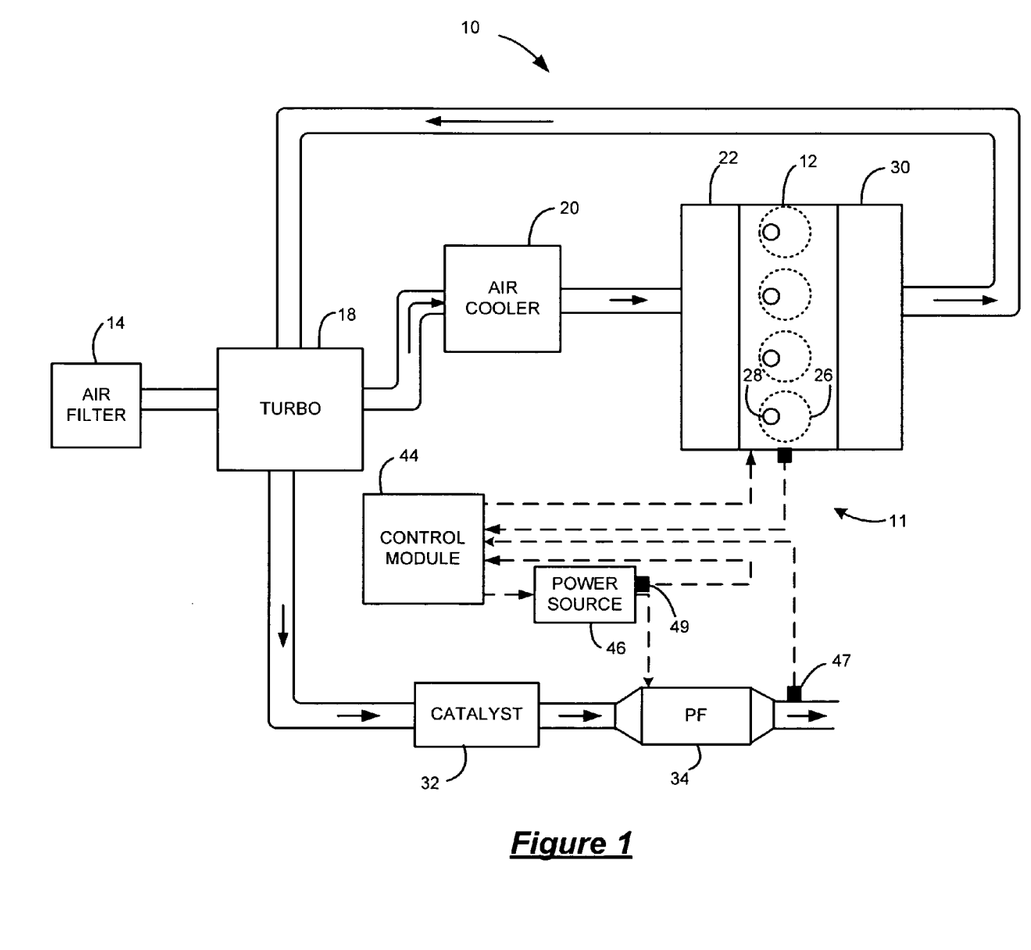
FIG. 1 is a functional block diagram of an exemplary vehicle including a particulate filter and a particulate filter regeneration diagnostic system according to various aspects of the present disclosure.

Referring now to FIG. 1, an exemplary vehicle 10 including a diesel engine system 11 is illustrated in accordance with various aspects of the present disclosure. It is appreciated that the diesel engine system 11 is merely exemplary in nature and that the particulate filter regeneration diagnostic system described herein can be implemented in various engine systems implementing a particulate filter. Such engine systems may include, but are not limited to, gasoline direct injection engine systems and homogeneous charge compression ignition engine systems. For ease of the discussion, the disclosure will be discussed in the context of a diesel engine system.

A turbocharged diesel engine system 11 includes an engine 12 that combusts an air and fuel mixture to produce drive torque. Air enters the system by passing through an air filter 14. Air passes through the air filter 14 and is drawn into a turbocharger 18. The turbocharger 18 compresses the fresh air entering the system 11. The greater the compression of the air generally, the greater the output of the engine 12. Compressed air then passes through an air cooler 20 before entering into an intake manifold 22.

Air within the intake manifold 22 is distributed into cylinders 26. Although four cylinders 26 are illustrated, it is appreciated that the systems and methods of the present disclosure can be implemented in engines having a plurality of cylinders including, but not limited to, 2, 3, 4, 5, 6, 8, 10 and 12 cylinders. It is also appreciated that the systems and methods of the present disclosure can be implemented in a v-type cylinder configuration. Fuel is injected into the cylinders 26 by fuel injectors 28. Heat from the compressed air ignites the air/fuel mixture. Combustion of the air/fuel mixture creates exhaust. Exhaust exits the cylinders 26 into the exhaust system.

The exhaust system includes an exhaust manifold 30, a diesel oxidation catalyst (DOC) 32, and a particulate filter (PF) 34. Optionally, an EGR valve (not shown) re-circulates a portion of the exhaust back into the intake manifold 22. The remainder of the exhaust is directed into the turbocharger 18 to drive a turbine. The turbine facilitates the compression of the fresh air received from the air filter 14. Exhaust flows from the turbocharger 18 through the DOC 32 and the PF 34. The DOC 32 oxidizes the exhaust based on the post combustion air/fuel ratio. The amount of oxidation increases the temperature of the exhaust. The PF 34 receives exhaust from the DOC 32 and filters any particulates present in the exhaust.

A control module 44 controls the engine 12 and PF regeneration based on various sensed and/or modeled information. More specifically, the control module 44 estimates loading of the PF 34. When the estimated loading achieves a threshold level (e.g., 5 grams/liter of particulate matter) and the exhaust flow rate is within a desired range, current is controlled to the PF 34 via a power source 46 to initiate the regeneration process. The duration of the regeneration process varies based upon the amount of particulate matter within the PF 34. It is anticipated, that the regeneration process can last between 1-6 minutes. Current is only applied, however, during an initial portion of the regeneration process. More specifically, the electric energy heats the face of the PF 34 for a threshold period (e.g., 1-2 minutes). Exhaust passing through the front face is heated. The remainder of the regeneration process is achieved using the heat generated by combustion of particulate matter present near the heated face of the PF 34 or by the heated exhaust passing through the PF 34.

To ensure that complete regeneration has occurred, the control module 44 diagnoses the regeneration of the PF 34 based on the particulate filter regeneration diagnostic systems and methods of the present disclosure. In particular, the control module 44 diagnoses the PF 34 based on one or more sensor signals received from the vehicle 10. In various embodiments, an exhaust temperature sensor 47 generates an exhaust temperature signal based on a temperature of the exhaust exiting the PF 34. A current and/or voltage sensor 49 generates a current and/or voltage signal based on the current and/or voltage supplied by the power source 46 to the PF 34. The control module 44 receives the signals and diagnoses the regeneration of the PF 34 by determining whether the PF 34 is operational and/or whether the operational temperature of the PF 34 is hot enough that damage can be caused to the PF 34.

Figure 2:
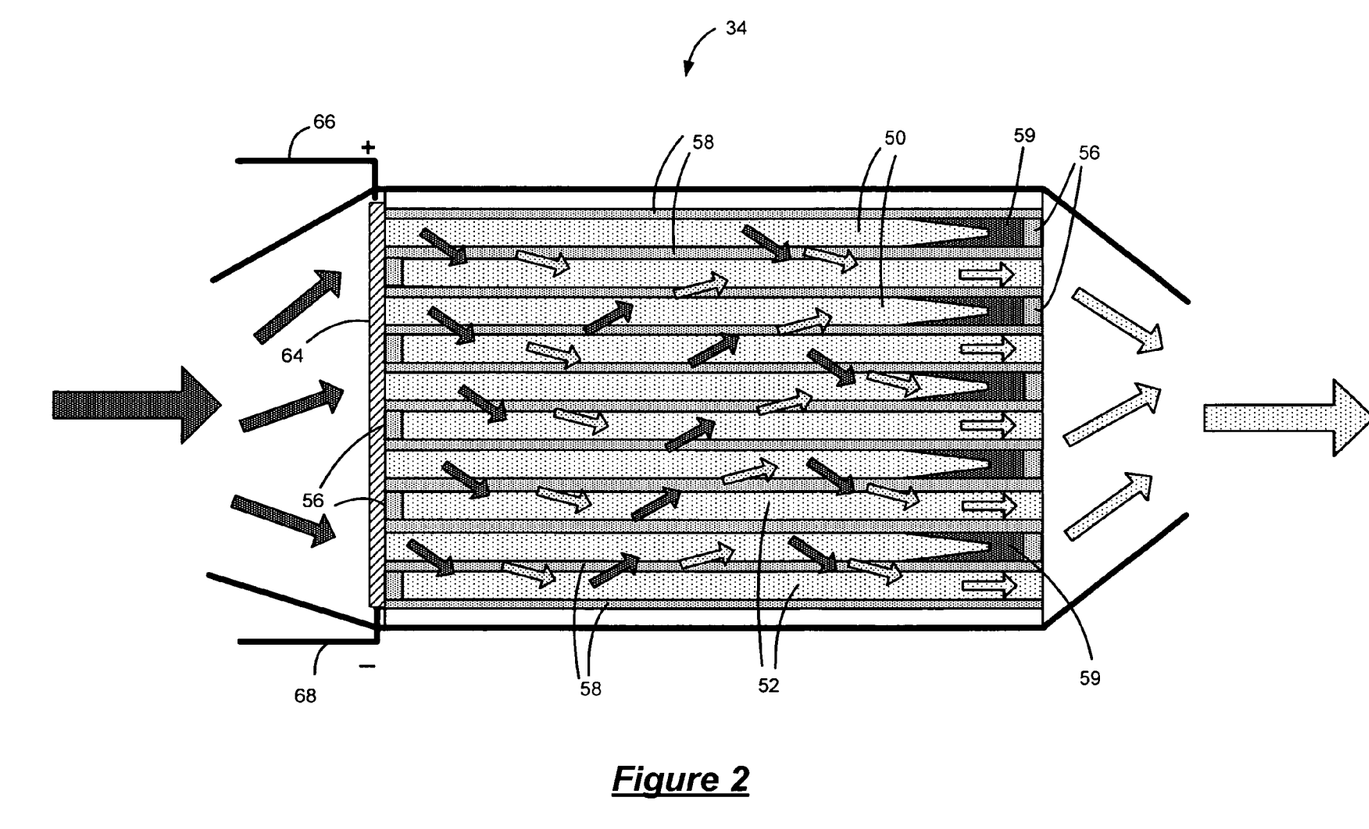
FIG. 2 is a cross-sectional view of an exemplary wall-flow monolith particulate filter.

With particular reference to FIG. 2, the PF 34 is preferably a monolith particulate trap and includes alternating closed cells/channels 50 and opened cells/channels 52. The cells/channels 50, 52 are typically square cross-sections, running axially through the part. Walls 58 of the PF 34 are preferably comprised of a porous ceramic honeycomb wall of cordierite material. It is appreciated that any ceramic comb material is considered within the scope of the present disclosure. Adjacent channels are alternatively plugged at each end as shown at 56. This forces the diesel aerosol through the porous substrate walls which act as a mechanical filter. Particulate matter is deposited within the closed channels 50 and exhaust exits through the opened channels 52. Particulate matter 59 flows into the PF 34 and is trapped therein.

For regeneration purposes, a grid 64 including an electrically resistive material is attached to the front exterior surface referred to as the front face of the PF 34. Current is supplied to the resistive material to generate thermal energy. It is appreciated that thick film heating technology may be used to attach the grid 64 to the PF 34. For example, a heating material such as Silver or Nichrome may be coated then etched or applied with a mask to the front face of the PF 34. In various other embodiments, the grid 64 is composed of electrically resistive material such as stainless steel and attached to the PF 34 using an adhesive or press fit to the PF 34.

Figure 3:
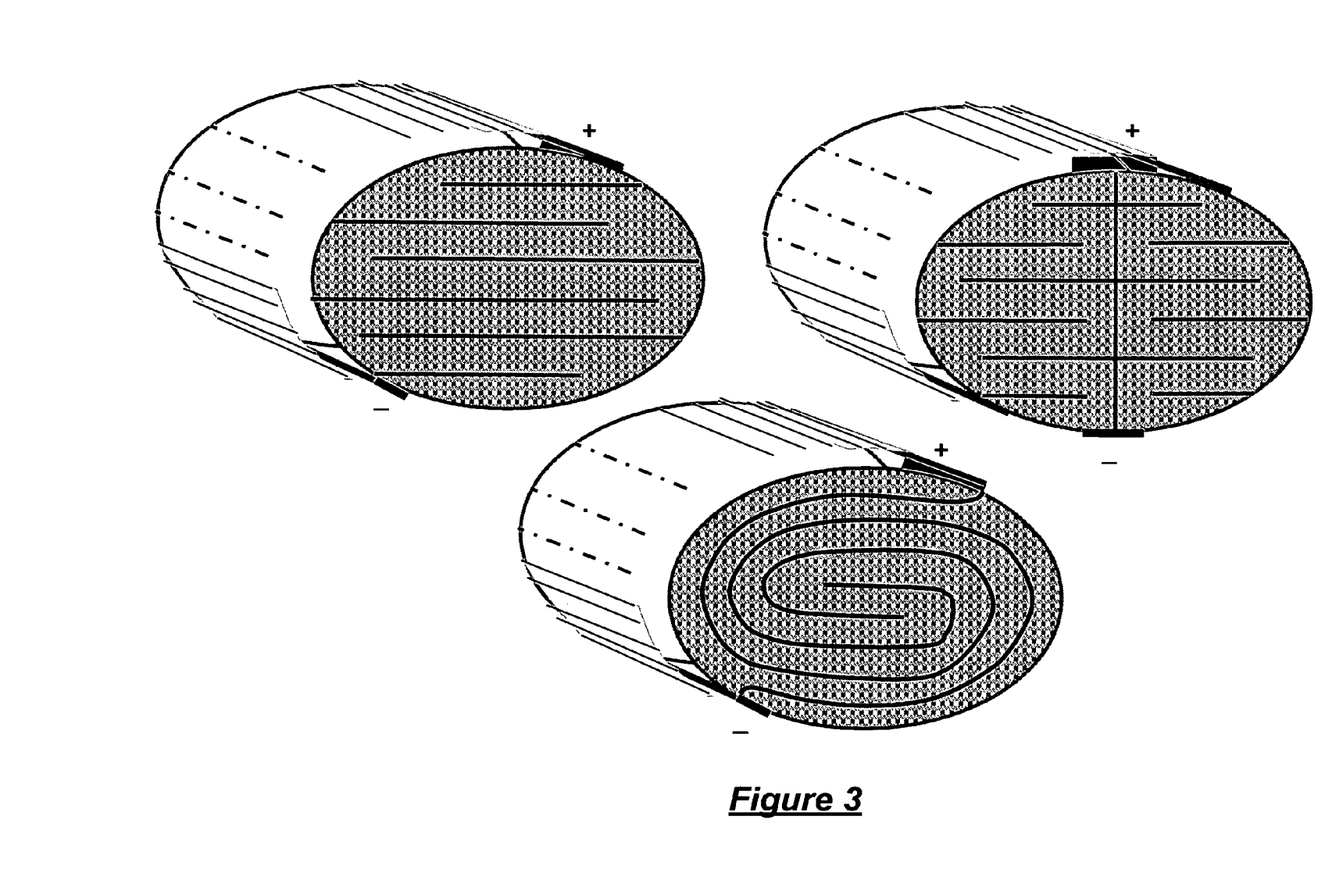
FIG. 3 includes perspective views of exemplary front faces of particulate filters illustrating various patterns of resistive paths.
Figure 4:
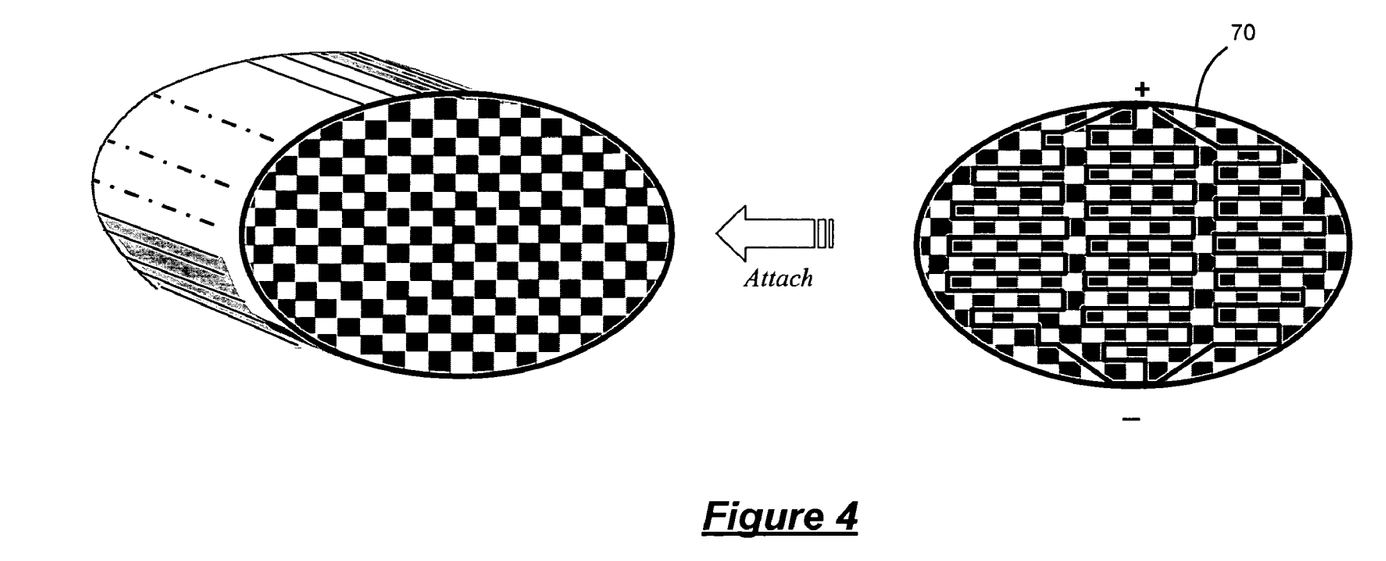
FIG. 4 is a perspective view of a front face of an exemplary particulate filter and an exemplary heater insert.

It is also appreciated that the resistive material may be applied in various single or multi-path patterns as shown in FIG. 3. Segments of resistive material can be removed to generate the pathways. In various embodiments a perforated heater insert 70 as shown in FIG. 4 may be attached to the front face of the PF 34. In any of the above mentioned embodiments, exhaust passing through the PF 34 carries thermal energy generated at the front face of the PF 34 a short distance down the channels 50, 52. The increased thermal energy ignites particulate matter present near the inlet of the PF 34. The heat generated from the combustion of the particulates is then directed through the PF 34 to induce combustion of the remaining particulates within the PF 34.

Figure 5:
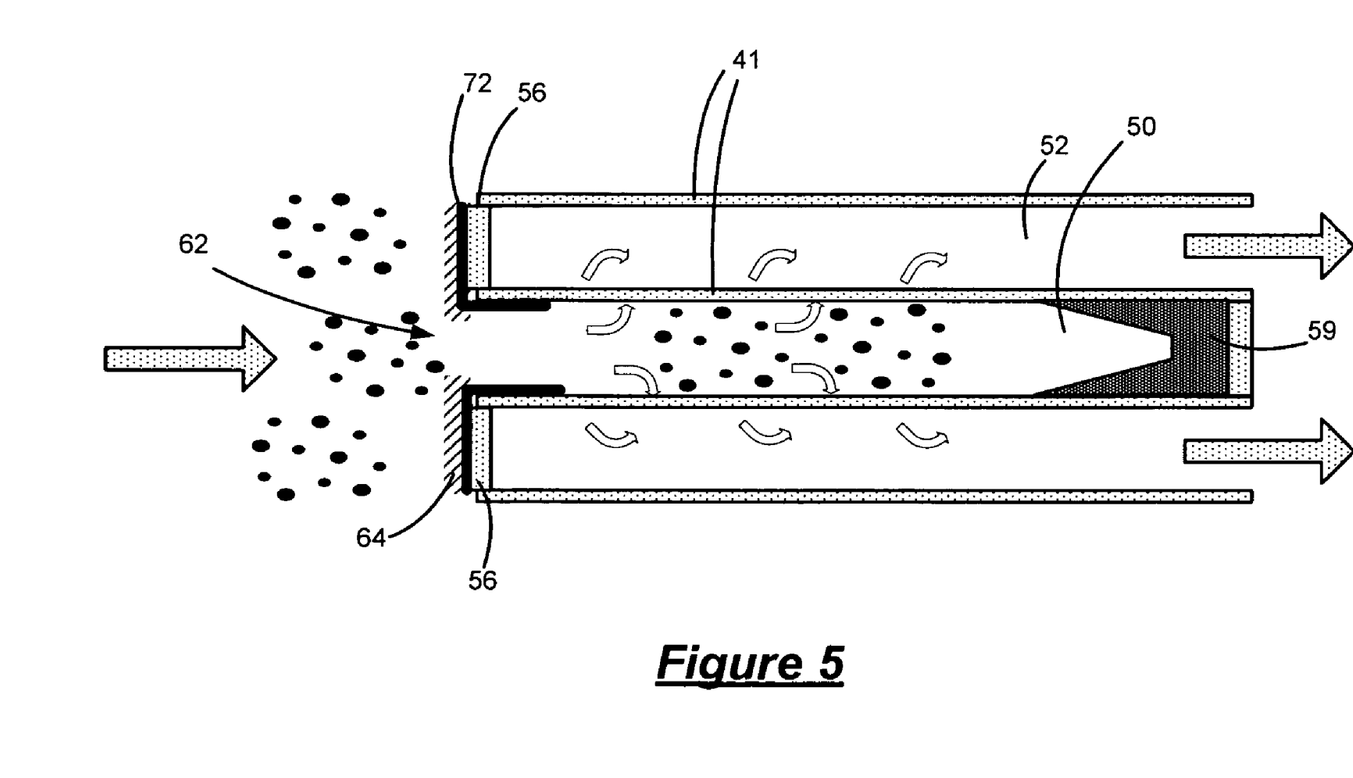
FIG. 5 is a cross-sectional view of a portion of the particulate filter of FIG. 2 including a conductive coating.

With particular reference to FIG. 5, a thermally conductive coating 72 can be additionally applied at the inlets 62 of the channels 50, 52. The coating 72 can extend a short distance down the opened ends of the closed channels 50. In various embodiments, the conductive coating extends within an inch of the front face of the PF 34. The resistive material of the grid 64 contacts the conductive coating 72. Thermal energy is transferred to the conductive coating 72 when electrical energy passes through the resistive material. Heat from the conductive coating 72 ignites particulate matter present near the inlet of the PF 34.

Figure 6:
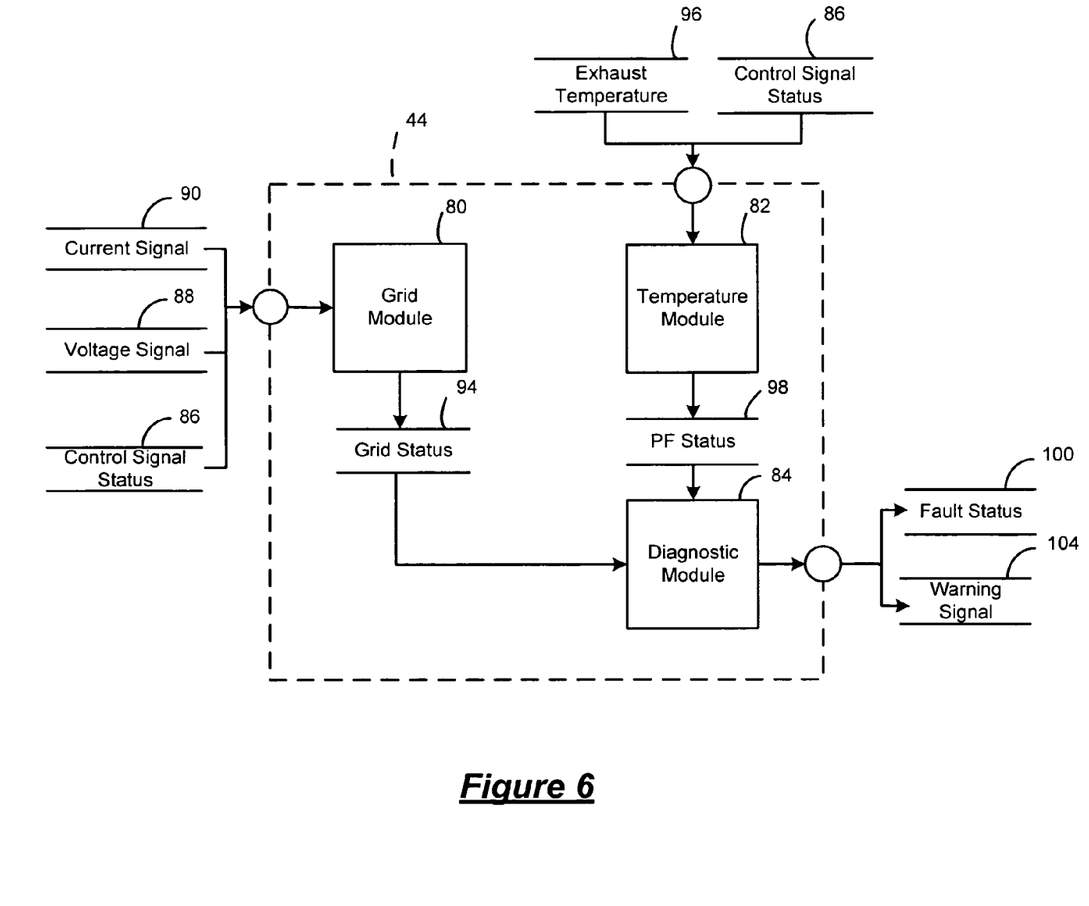
FIG. 6 is a dataflow diagram illustrating and exemplary particulate filter regeneration diagnostic system according to various aspects of the present disclosure.

Referring now to FIG. 6, a dataflow diagram illustrates various embodiments of a particulate filter regeneration diagnostic system that may be embedded within the control module 44. Various embodiments of particulate filter regeneration diagnostic systems according to the present disclosure may include any number of sub-modules embedded within the control module 44. As can be appreciated, the sub-modules shown in FIG. 6 may be combined and/or further partitioned to similarly diagnose regeneration of the PF 34. Inputs to the system may be sensed from the vehicle 10 (FIG. 1), received from other control modules (not shown) within the vehicle 10 (FIG. 1), and/or determined by other sub-modules (not shown) within the control module 44. In various embodiments, the control module 44 of FIG. 6 includes a grid module 80, a temperature module 82, and a diagnostic module 84.

The grid module 80 receives as input a control signal status 86, a voltage signal 88, and/or a current signal 90. Based on the inputs 86-90, the grid module 80 sets a grid status 94 that indicates an operational status of the grid 64 (FIG. 2). For example, once the control signal status 86 indicates the grid 64 (FIG. 2) is activated, the voltage signal 88 and the current signal 90 are evaluated. If there is a voltage value but no current value, the grid 64 (FIG. 2) is faulty. If there is a current value but no voltage value, the circuitry to the grid 64 (FIG. 2) is faulty, for example, a short circuit. In various embodiments, the grid status 94 can be an enumeration indicating the type of grid fault. For example, the grid status 94 can be an enumeration with values indicating 'a grid fault,' a 'short circuit fault,' or 'no fault.'

The temperature module 82 receives as input the control signal status 86 and an exhaust temperature 96. Based on the inputs 86, 96, the temperature module 82 sets a PF status 98 indicating an operational status of the PF 34 (FIG. 1). For example, after the control signal status 86 indicates that the grid 64 (FIG. 2) has been activated, the exhaust temperature 96 is evaluated to determine whether the peak operating temperature exceeds a temperature threshold. The temperature threshold can indicate a maximum temperature at which the PF 34 (FIG. 1) can operate without causing damage to the PF 34 (FIG. 1). Exhaust temperatures above such temperature threshold will inevitably cause damage to the PF 34. In various embodiments, the exhaust temperature 96 is evaluated after a predetermined time period, beginning from the time of grid activation, has expired.

The diagnostic module 84 receives as input the grid status 94 and the PF status 98. Based on the inputs 94, 98, the diagnostic module 84 sets one or more fault status signals 100 and/or generates a warning signal 104. For example, if the grid status 94 or the PF status 98 indicates one or more faults for X consecutive seconds or for X out of Y samples, the fault status signal 100 is set to 'Test Fail.' If, however, the grid status 94 and the PF status 98 indicate no faults, the fault status signal 100 is set to 'Test Pass.' In various embodiments, the fault status signals 100 correspond to predefined diagnostic trouble codes.

The diagnostic module 84 can additionally or alternatively generate the warning signal 104. For example, if the grid status 94 or the PF status 98 indicates one or more faults for X consecutive seconds or for X out of Y samples, the warning signal 104 may be generated. In various embodiments, the warning signal 104 may be an audio signal that activates an audio system (not shown) of the vehicle 10 (FIG. 1). In various other embodiments, the warning signal 104 may be an indicator signal that activates a warning lamp (not shown) of the vehicle 10 (FIG. 1). In various other embodiments, the warning signal 104 includes the appropriate diagnostic trouble code and can be retrieved by a service tool or transmitted to a remote location via a telematics system (not shown) of the vehicle 10 (FIG. 1).

Figure 7:
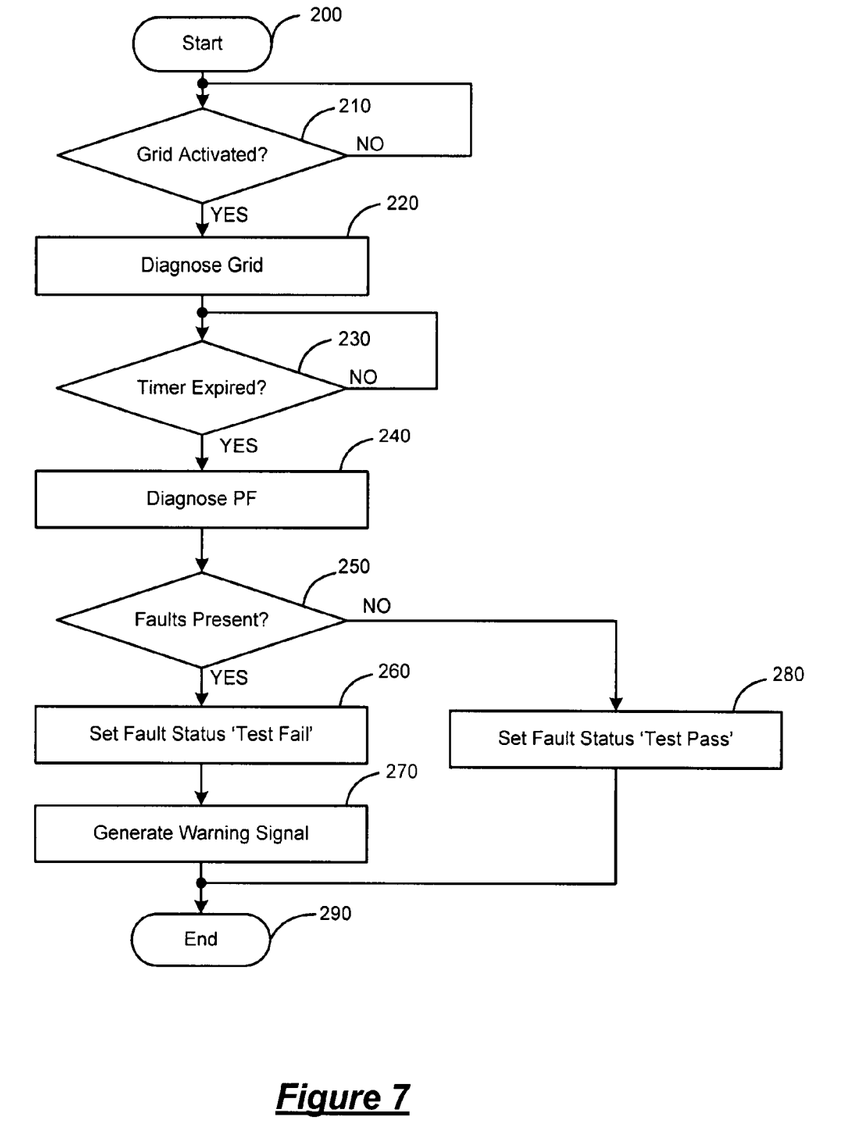
FIG. 7 is a flowchart illustrating an exemplary particulate filter regeneration diagnostic method according to various aspects of the present disclosure.

Referring now to FIG. 7, a flowchart illustrates an exemplary particulate filter regeneration diagnostic method that can be performed by the particulate regeneration diagnostic system of FIG. 6 in accordance with various aspects of the present disclosure. As can be appreciated, the order of execution of the steps of the exemplary particulate filter regeneration diagnostic method can vary without altering the spirit of the method. The exemplary particulate filter regeneration diagnostic method may be performed periodically during control module operation or scheduled to run based on certain events.

In one example, the method may begin at 200. If the control signal status 86 indicates that the grid 64 (FIG. 2) has been activated at 210, the grid 64 (FIG. 2) is diagnosed by evaluating the current and/or the voltage signals 90, 88 at 220. Otherwise, the method continues to monitor the control signal status 86 at 210.

Once the grid 64 (FIG. 2) has been diagnosed at 220, a timer is evaluated at 230. If a time since the activation of the grid 64 (FIG. 2) has expired at 230, the PF 34 (FIG. 1) is diagnosed by evaluating the exhaust temperature 96 at 240. Otherwise, if the time since the activation of the grid 64 (FIG. 2) has not expired, the method continues to monitor the timer at 230.

Once the PF 34 (FIG. 1) has been diagnosed at 240, the status of the grid 64 (FIG. 2) and the PF 34 (FIG. 1) are evaluated at 250. If the grid status 94 or the PF status 98 indicates a fault, for example, for X consecutive seconds at 250, the fault status signal 100 is set to 'Test Fail' at 260 and/or the warning signal 104 is generated at 270. Otherwise, if the grid status 94 and the PF status 98 indicate no fault, for example, for X consecutive seconds at 250, the fault status signal 100 is set to 'Test Pass' at 280. The method may end at 290.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A system comprising:
   a grid module that diagnoses a fault of a resistive grid that heats a particulate filter of an exhaust system of a vehicle based on a voltage signal of the resistive grid; and
   a diagnostic module that at least one of sets a fault status and generates a warning signal based on the fault.

2. The system of claim 1 wherein the grid module evaluates a current signal of the resistive grid and the voltage signal based on a grid activation status.

3. The system of claim 1 further comprising a temperature module that diagnoses a fault of the particulate filter based on a temperature of exhaust exiting the particulate filter.

4. The system of claim 3 wherein the temperature module evaluates the temperature of the exhaust based on a grid activation status.

5. The system of claim 4 wherein the temperature module evaluates the exhaust temperature based on a predetermined time period that begins based on the grid activation status.

6. The system of claim 3 wherein the temperature module diagnoses the fault of the particulate filter when the temperature of the exhaust exceeds a predetermined threshold.

7. The system of claim 1 wherein the warning signal is an audio warning signal.

8. The system of claim 1 wherein the warning signal is transmitted to a remote location.

9. The system of claim 1 wherein the warning signal is a visual warning signal.

10. The system of claim 1 wherein the fault status corresponds to a diagnostic trouble code.

11. A method comprising:
    diagnosing a fault of a resistive grid that heats a particulate filter of an exhaust system of a vehicle based on a voltage signal of the resistive grid;
    setting a fault status based on the fault.

12. The method of claim 11 further comprising evaluating a current signal of the resistive grid and the voltage signal based on a grid activation status.

13. The method of claim 11 further comprising diagnosing a fault of the particulate filter based on a temperature of exhaust exiting the particulate filter.

14. The method of claim 13 further comprising evaluating the temperature of the exhaust based on a grid activation status.

15. The method of claim 14 wherein the evaluating the exhaust temperature is further based on a predetermined time period that begins based on the grid activation status.

16. The method of claim 13 wherein the diagnosing the fault of the particulate filter occurs when the temperature of the exhaust exceeds a predetermined threshold.

17. The method of claim 11 further comprising transmitting a warning signal to a remote location based on the fault.

18. The system of claim 1 further comprising the resistive grid,
    wherein the resistive grid is adjacent to and arranged upstream from the particulate filter.

19. The system of claim 18 wherein the resistive grid is applied in a multi-path pattern across an inlet of the particulate filter.

20. The system of claim 18 wherein the resistive grid is configured as a perforated heater insert and is applied across an inlet surface of the particulate filter.

* * * * *